US012230434B2

(12) United States Patent
Inui et al.

(10) Patent No.: US 12,230,434 B2
(45) Date of Patent: Feb. 18, 2025

(54) ELECTRONIC COMPONENT

(71) Applicant: TDK CORPORATION, Tokyo (JP)

(72) Inventors: Kyosuke Inui, Tokyo (JP); Toru Tonogai, Tokyo (JP); Yuichi Oyanagi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 731 days.

(21) Appl. No.: 17/320,380

(22) Filed: May 14, 2021

(65) Prior Publication Data

US 2021/0358682 A1 Nov. 18, 2021

(30) Foreign Application Priority Data

May 14, 2020 (JP) ................................ 2020-085092

(51) Int. Cl.

*H01F 17/04* (2006.01)
*H01F 27/29* (2006.01)
*H01F 27/28* (2006.01)
*H01F 41/06* (2016.01)

(52) U.S. Cl.

CPC ......... *H01F 27/29* (2013.01); *H01F 27/2823* (2013.01); *H01F 41/06* (2013.01)

(58) Field of Classification Search

CPC .................................................. H01F 27/2823
USPC .......................................................... 336/221
See application file for complete search history.

(56) References Cited

U.S. PATENT DOCUMENTS

| | | | | |
|---|---|---|---|---|
| 6,144,280 | A | 11/2000 | Amada et al. | |
| 2013/0255071 | A1* | 10/2013 | Muneuchi | H01F 27/292 29/605 |
| 2014/0338185 | A1 | 11/2014 | Muneuchi et al. | |
| 2016/0035476 | A1 | 2/2016 | Mimura et al. | |
| 2016/0314890 | A1 | 10/2016 | Kitajima et al. | |
| 2017/0301458 | A1 | 10/2017 | Mimura et al. | |
| 2018/0182539 | A1 | 6/2018 | Muneuchi et al. | |
| 2019/0122809 | A1 | 4/2019 | Mimura et al. | |
| 2020/0365314 | A1 | 11/2020 | Mimura et al. | |
| 2021/0043366 | A1* | 2/2021 | Ooi | H01F 17/045 |

(Continued)

FOREIGN PATENT DOCUMENTS

| | | | |
|---|---|---|---|
| CN | 105321685 | A | 2/2016 |
| JP | H06-267784 | A | 9/1994 |

(Continued)

OTHER PUBLICATIONS

U.S. Appl. No. 17/320,402, filed May 14, 2021 in the name of Inui et al.

(Continued)

*Primary Examiner* — Ronald Hinson
(74) *Attorney, Agent, or Firm* — Oliff PLC

(57) ABSTRACT

An electronic component according to the present invention includes: an element body containing metal particles and a resin; and a resin electrode layer formed on an electrode facing portion which is a part of an outer surface of the element body. The resin electrode layer contains a resin component and a conductor powder. In addition, the electrode facing portion includes an exposed portion formed by removing the resin on an outermost surface of the element body to expose a part of an outer periphery of the metal particles located on the outermost surface. Then, the resin electrode layer and the exposed portion of the electrode facing portion are joined to each other.

6 Claims, 7 Drawing Sheets

(56) References Cited

U.S. PATENT DOCUMENTS

| | | | |
|---|---|---|---|
| 2021/0098186 A1 | 4/2021 | Wakabayashi | |
| 2021/0202152 A1 | 7/2021 | Wakabayashi | |
| 2021/0202154 A1 | 7/2021 | Wakabayashi | |
| 2021/0272740 A1* | 9/2021 | Wakabayashi | H01F 27/2804 |
| 2022/0208463 A1 | 6/2022 | Hoshino | |

FOREIGN PATENT DOCUMENTS

| | | | |
|---|---|---|---|
| JP | H11-345745 | A | 12/1999 |
| JP | 2013-045926 | A | 3/2013 |
| JP | 2014-225590 | A | 12/2014 |
| JP | 2017-191941 | A | 10/2017 |
| JP | 2018-006501 | A | 1/2018 |
| JP | 2018-107198 | A | 7/2018 |
| WO | 94/10697 | A1 | 5/1994 |
| WO | 2015/115180 | A1 | 8/2015 |

OTHER PUBLICATIONS

Jan. 31, 2024 Office Action issued in U.S. Appl. No. 17/320,402.

Aug. 5, 2024 Notice of Allowance issued in U.S. Appl. No. 17/320,402.

* cited by examiner

ELECTRONIC COMPONENT

BACKGROUND OF THE INVENTION

Technical Field

The present invention relates to an electronic component having a terminal electrode.

Background

As one kind of the electronic component, an electronic component in which a terminal electrode (also referred to as "external electrode") is formed on an outer surface of an element body is known. In this electronic component, typically, the terminal electrode is formed by applying conductive paste on the outer surface of the element body and performing a baking treatment. In addition, the terminal electrode may be formed by a plating method, a sputtering method, or the like. However, in a case where a resin component is contained in the element body of the electronic component, the terminal electrode is not sufficiently in close contact with the outer surface of the element body, and joining strength of the terminal electrode may not be sufficiently secured.

On the other hand, Patent Document 1 discloses a technology of forming a contact portion with the terminal electrode on an outer surface of an element body by cutting a part of the element body with a dicer. When being processed with the dicer, metal particles themselves contained inside the element body are also scraped off, and thus a cross-section of the metal particles is exposed to the outer surface of the element body. As a result, the terminal electrode constituted by a plated film is likely to be formed at a portion processed with the dicer. However, in the technology disclosed in Patent Document 1, on the outer surface of the element body, not only the cross-section of the metal particles but also a large amount of a resin component contained in the element body is exposed (refer to FIG. 4 in Patent Document 1). Therefore, in the technology disclosed in Patent Document 1, the joining strength of the terminal electrode to the outer surface of the element body is not yet sufficient.

[Patent Document 1] WO 2015/115180 A

SUMMARY

The present invention has been made in view of above circumstances, and an object thereof is to provide an electronic component in which joining strength of a terminal electrode to the element body is improved.

To accomplish the above object, the electronic component according to the present invention including:

an element body containing metal particles and a resin; and a resin electrode layer formed an electrode facing portion which is a part of an outer surface of the element body, wherein the resin electrode layer contains a resin component and a conductor powder, the electrode facing portion includes an exposed portion formed by removing the resin on an outermost surface of the element body to expose a part of an outer periphery of the metal particles located on the outermost surface, and the resin electrode layer and the exposed portion of the electrode facing portion are joined to each other.

In the electronic component of the present invention, by having above configuration, a part of the resin electrode layer gets into a gap among the metal particles exposed at the electrode facing portion. Then, joining strength of the terminal electrode (resin electrode layer) to the electrode facing portion of the element body is improved. In addition, in the electronic component of the present invention, an insulation coating may remain on a surface of the metal particles located at the exposed portion. In this case, the insulation coating of the metal particles is exposed on the outermost surface of the exposed portion. That is, in the electronic component of the present invention, even when the insulation coating of the metal particles is not removed at the electrode facing portion, joining strength of the terminal electrode can be sufficiently secured. Note that, in the electronic component of the present invention, the resin electrode layer constitutes at least a part of the terminal electrode.

Preferably, the conductor powder of the resin electrode layer includes first particles having a particle size in a micrometer order, and second particles having a particle size in a nanometer order. Due to the above configuration, the second particles are filled among the first particles in the resin electrode layer. As a result, a resistance of the terminal electrode can be reduced.

Also, preferably, the metal particles contained in the element body are constituted by at least two or more kinds of particle groups different in an average particle size. Due to the above configuration, a packing density of the metal particles contained in the element body can be improved, and a ratio of the resin exposed at the electrode facing portion can be reduced. As a result, adhesiveness between the electrode facing portion and the resin electrode layer is enhanced, and the joining strength of the terminal electrode can be further improved.

In addition, it is preferable that a part of the second particles contained in the resin electrode layer are entered in a gap among the metal particles on the outermost surface of the exposed portion. By filling the second particles having the nanometer order to the gap among the metal particles located on the outermost surface of the exposed portion, adhesiveness between the electrode facing portion and the resin electrode layer further increases, and joining strength of the terminal electrode can be further improved.

The electrode facing portion may further include a leadout electrode portion having a conductor exposed, and a non-exposed portion having the resin not removed in addition to the exposed portion. In this case, it is preferable that the exposed portion is located at the periphery of the leadout electrode portion in a plane direction of the electrode facing portion. Note that, the non-exposed portion may be located on an outer periphery of the exposed portion in the plane direction. Due to the above configuration, adhesiveness between the leadout electrode portion and the terminal electrode further increases, and the joining strength of the terminal electrode can be further improved. In addition, the resistance of the terminal electrode can be reduced.

and

Figure 4A:
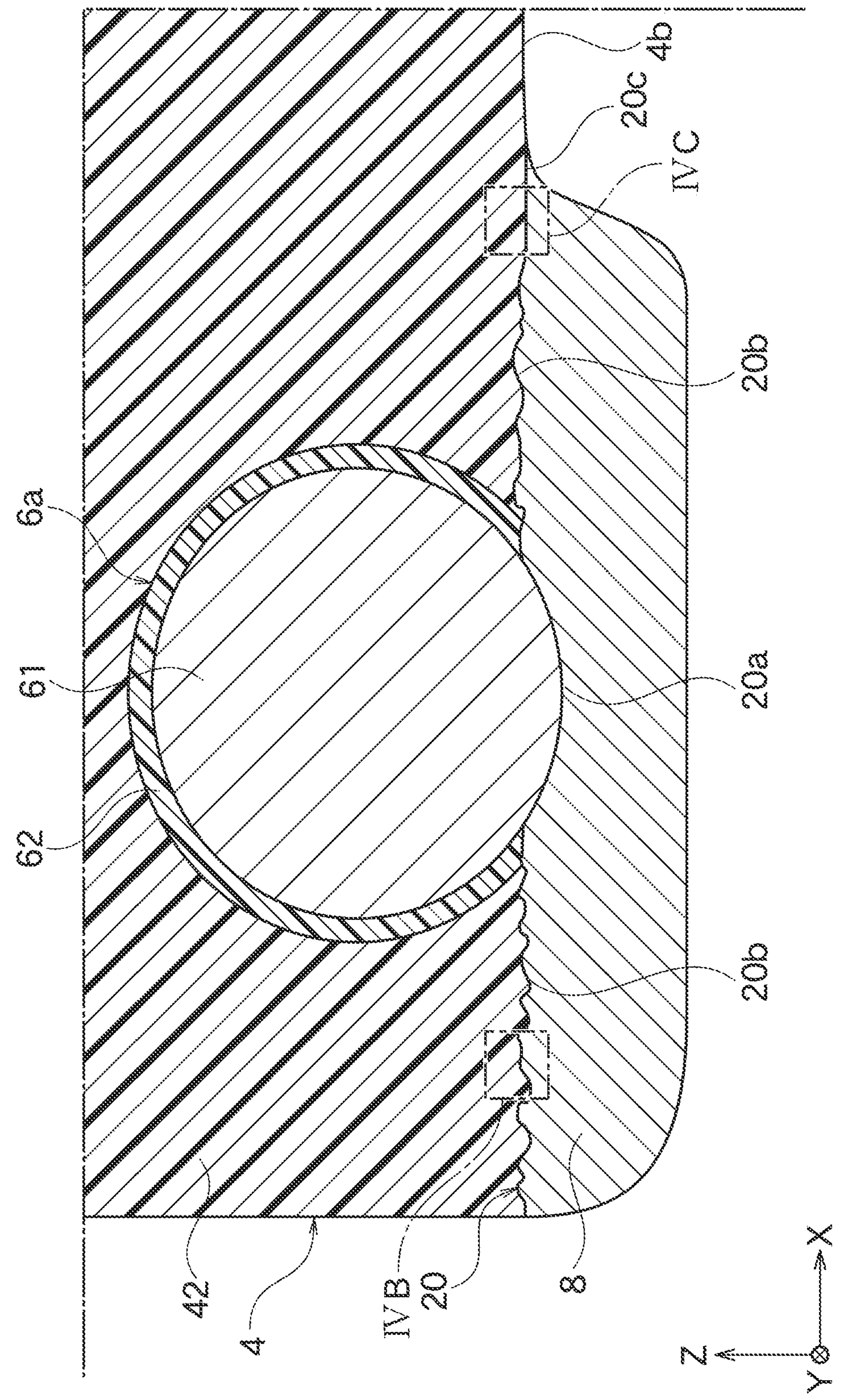
FIG. 4A is a cross-sectional view illustrating an interface between an element main body (electrode facing portion) and a terminal electrode.
Figure 4B:
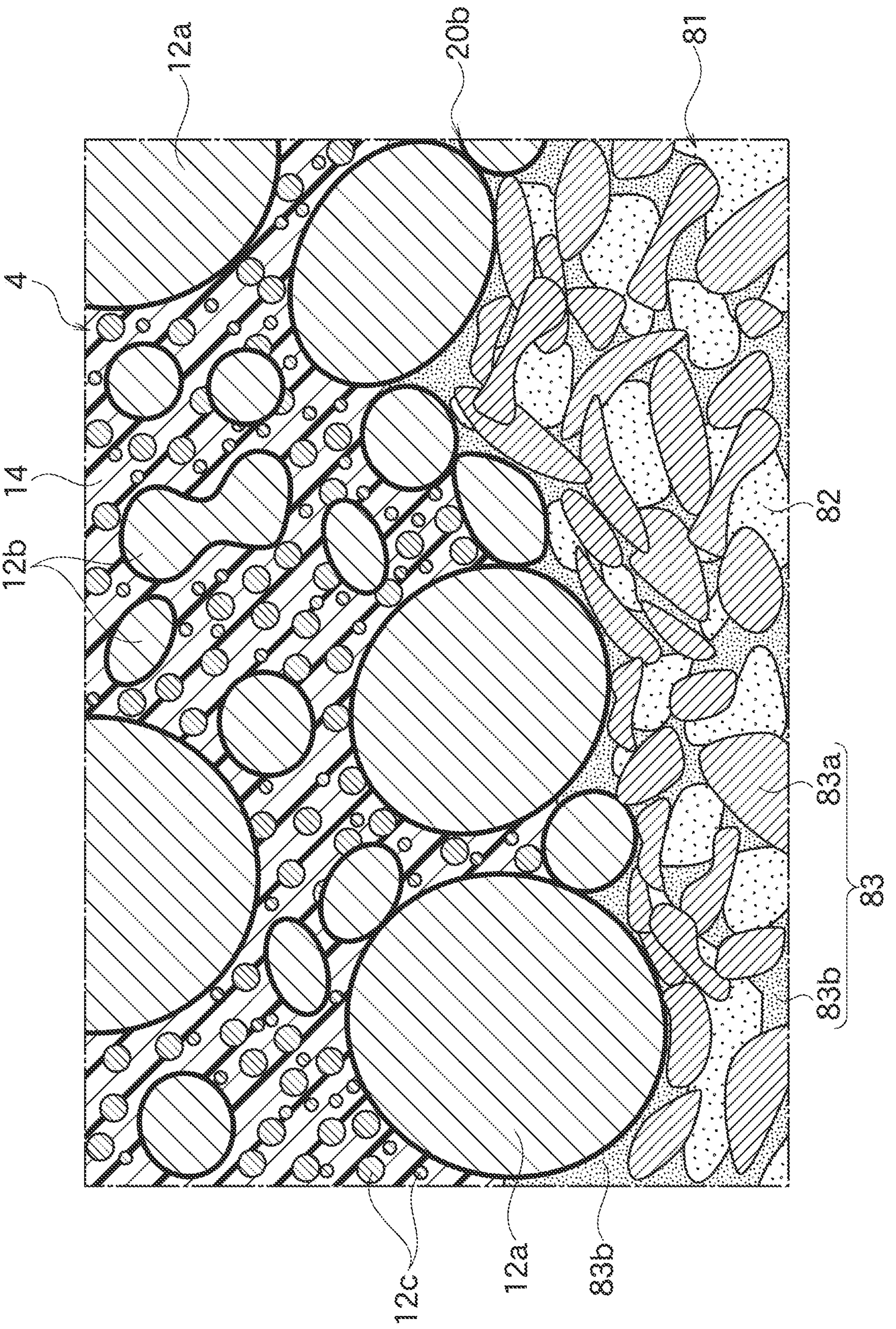
FIG. 4B is an enlarged cross-sectional view of a region IVB shown in FIG. 4A.
Figure 4C:
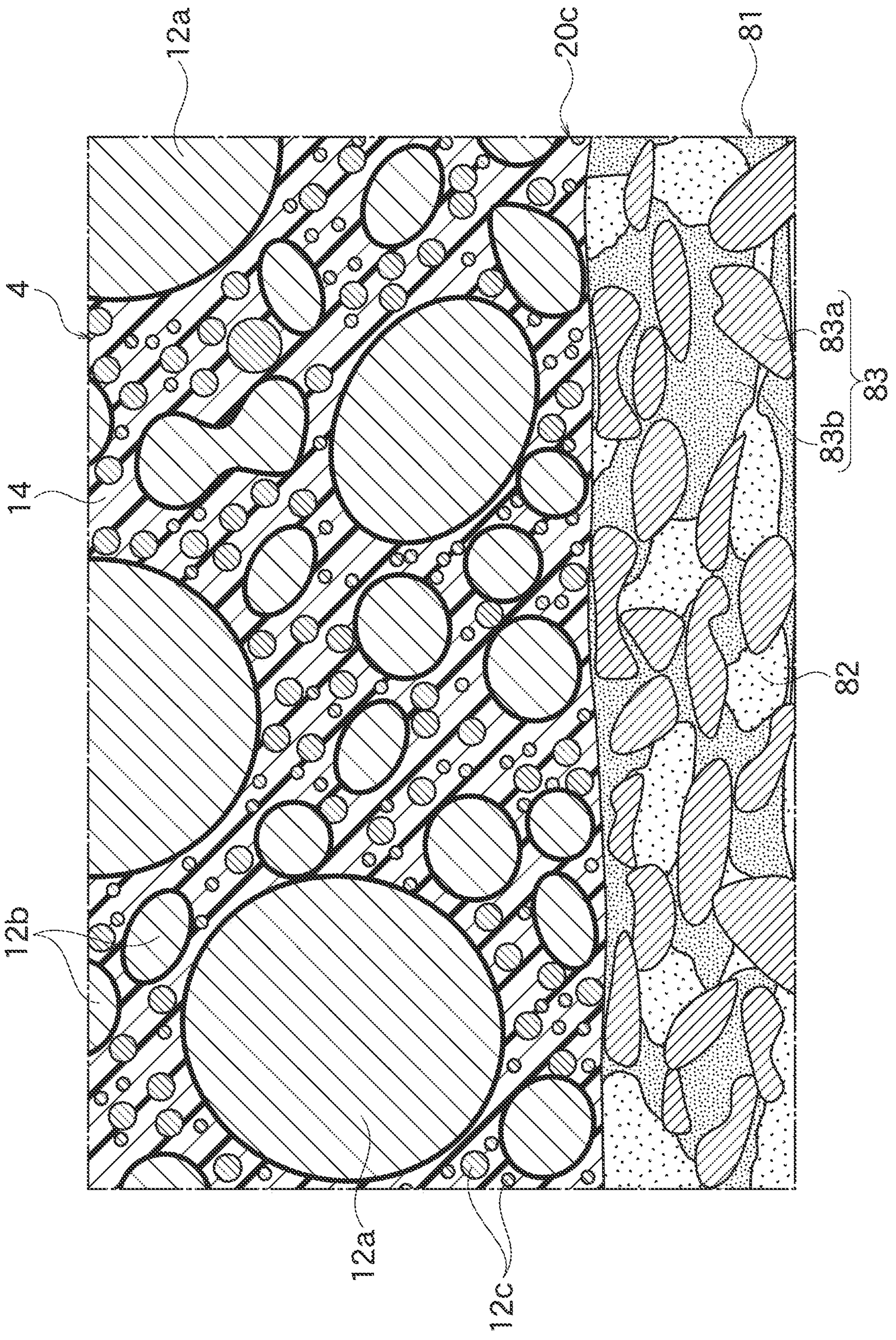

FIG. 4C is an enlarged cross-sectional view of a region IVC shown in FIG. 4A.

DETAILED DESCRIPTION OF THE EMBODIMENTS

Hereinafter, the present invention is described based on an embodiment shown in the drawings.

Figure 1:
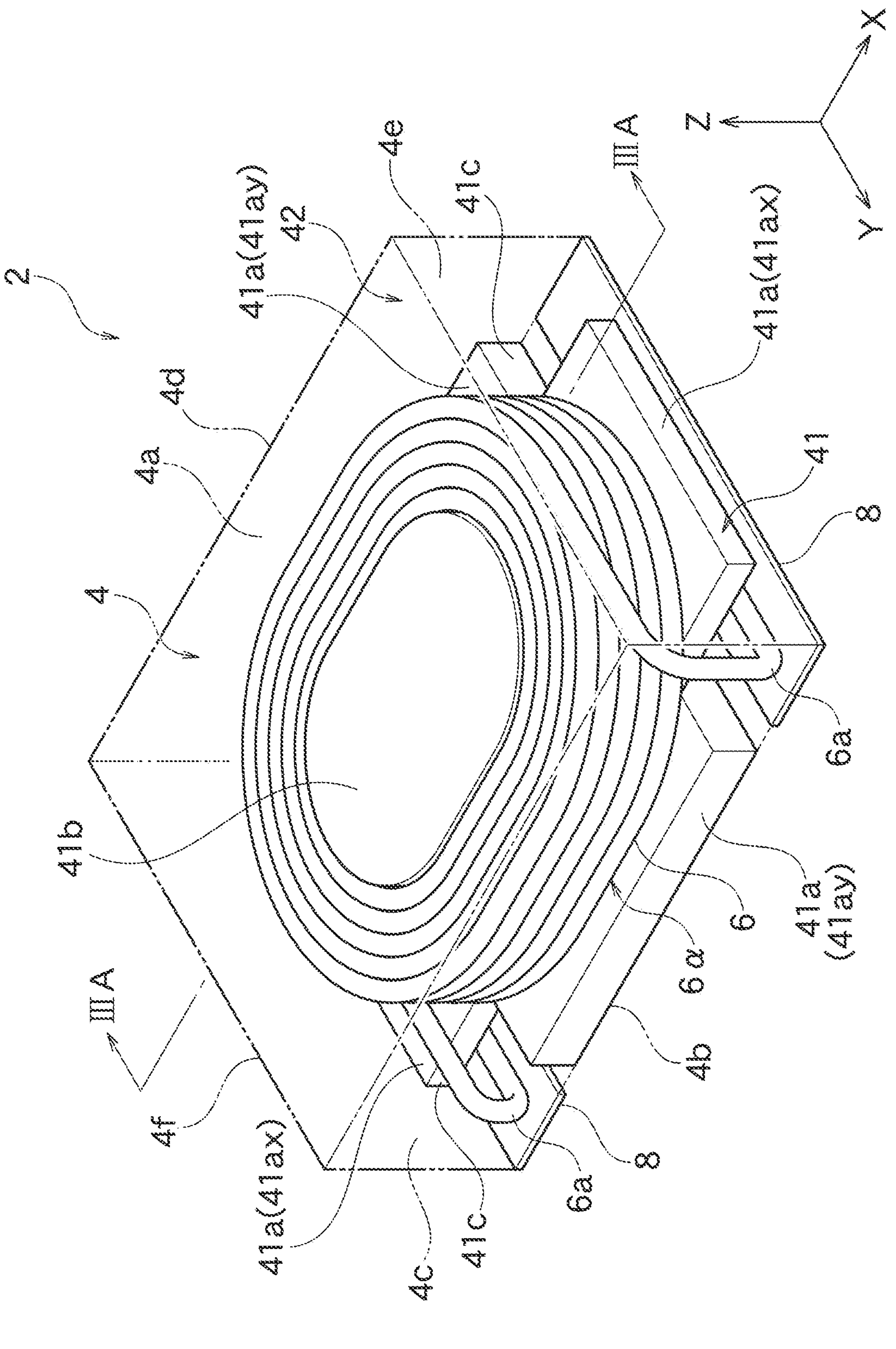
FIG. 1 is a perspective view of a coil device according to an embodiment of the present invention.

As shown in FIG. 1, an inductor 2 as an electronic component according to this embodiment of the present invention includes an element main body 4 having an approximately rectangular parallelepiped shape (approximately hexahedron).

The element main body 4 includes an upper surface 4*a*, a bottom surface 4*b* locate on an opposite side of the upper surface 4*a* in a Z-axis direction, and four side surfaces 4*c* to 4*f*. Dimensions of the element main body 4 are not particularly limited. For example, a dimension of the element main body 4 in an X-axis direction may be set to 1.2 to 6.5 mm, a dimension of that in a Y-axis direction may be set to 0.6 to 6.5 mm, and a dimension of that in a height (Z-axis) direction may be set to 0.5 to 5.0 mm.

Figure 2:
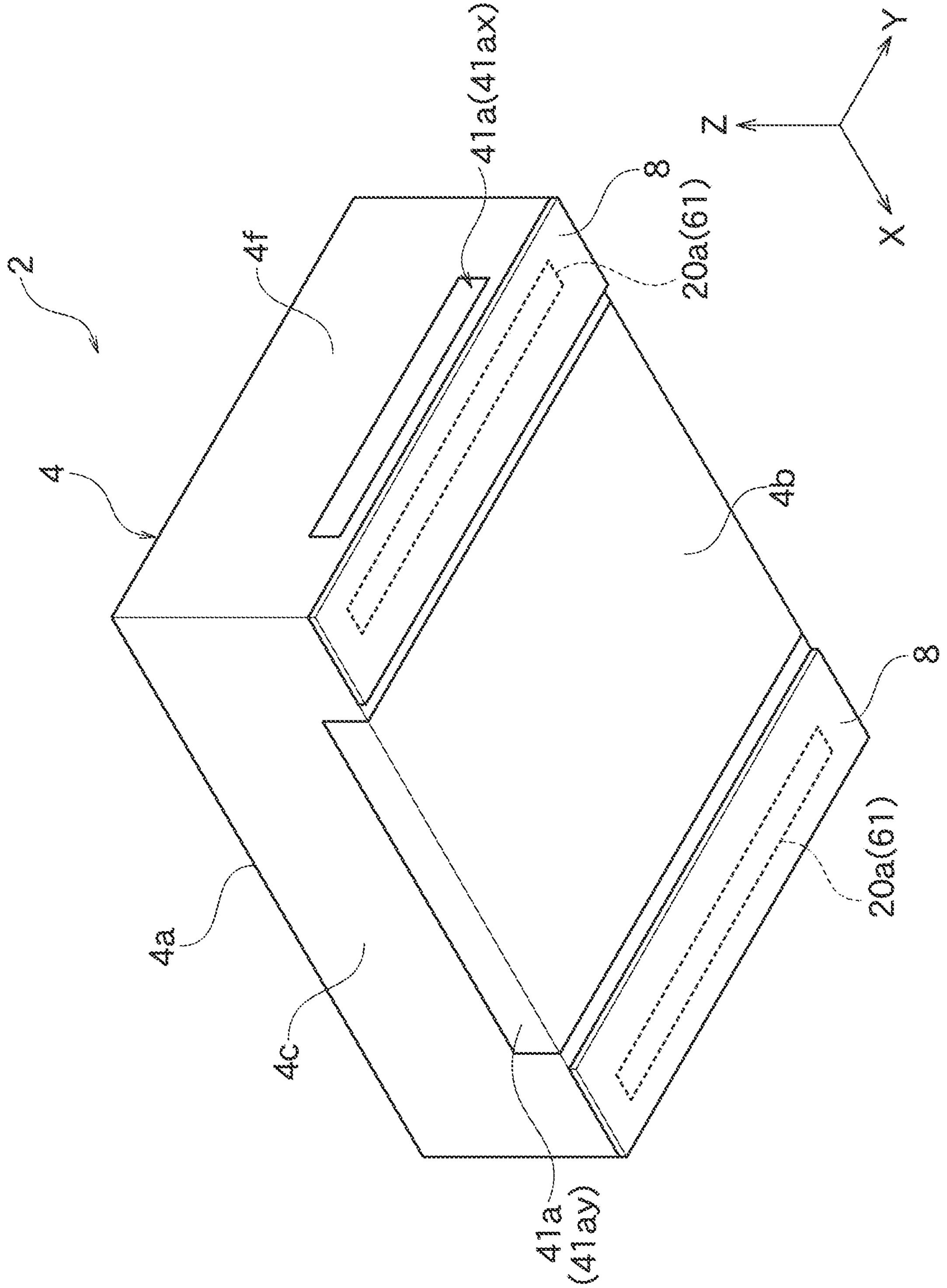
FIG. 2 is a perspective view of the coil device shown in FIG. 1 viewed from a mounting surface side.

As shown in FIG. 1 and FIG. 2, a pair of terminal electrodes 8 is formed on the bottom surface 4*b* of the element main body 4. The pair of terminal electrodes 8 are formed to be spaced (separated) from each other in the X-axis direction, and are insulated from each other. In the inductor 2 of this embodiment, an external circuit can be connected to the terminal electrodes 8 through an interconnection (not illustrated) or the like. Alternatively, the inductor 2 can be mounted on various substrates such a circuit substrate by using a joining member such as solder or conductive adhesive. In the case of being mounted on the substrate, the bottom surface 4*b* of the element main body 4 becomes a mounting surface, and the terminal electrodes 8 are joined to the substrate by the joining member.

In addition, the element main body 4 includes a coil portion 6α at the inside thereof. The coil portion 6α is constituted by winding a wire 6 as a conductor in a coil shape. In FIG. 1 of this embodiment, the wire 6 of the coil portion 6α is wound with a typical normal-wise manner, but a winding method of the wire 6 is not limited thereto. For example, the winding method of the wire 6 may be α-winding or edge-wise winding. Alternatively, the wire 6 may be directly wound around a core portion 41*b* (refer to FIG. 3A) to be described later.

The wire 6 that constitutes the coil portion 6α includes a conductor portion 61 that mainly contains copper, and an insulating layer 62 that covers an outer periphery of the conductor portion. More specifically, the conductor portion 61 is constituted by pure copper such as oxygen-free copper and tough pitch copper, a copper-containing alloy such as phosphor bronze, brass, red brass, beryllium copper, and silver-copper alloy, or a copper-coated steel wire. On the other hand, the insulating layer 62 is not particularly limited as long as the insulating layer 62 has an electrical insulating property. Examples thereof include an epoxy resin, an acrylic resin, polyurethane, polyimide, polyamide-imide, polyester, nylon, and the like, or a synthetic resin obtained by mixing at least two or more kinds of the above resins. In addition, as shown in FIG. 1 and FIG. 3A, the wire 6 of this embodiment is a round wire, and a cross-sectional shape of the conductor portion has a circular shape.

Figure 3A:
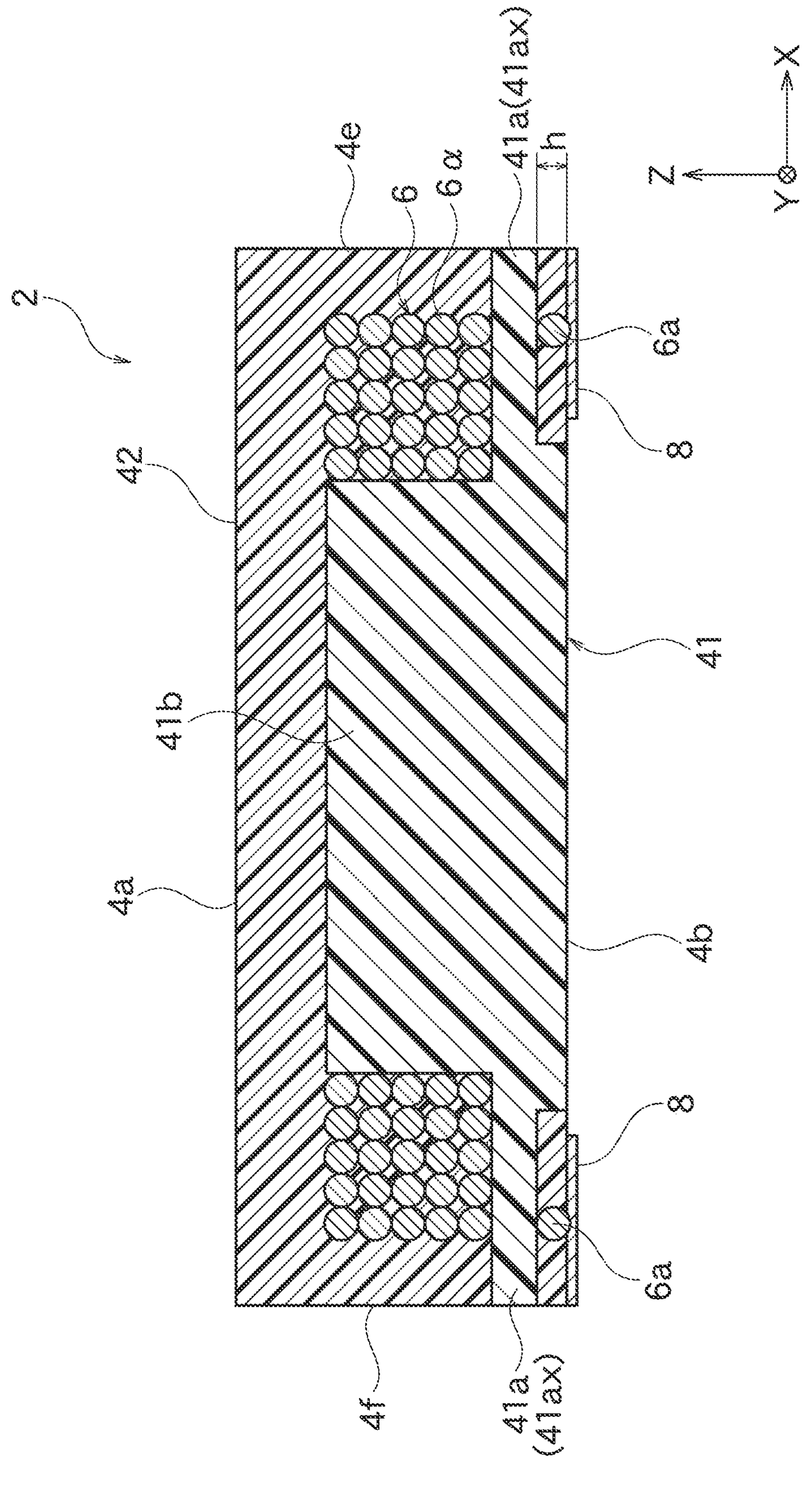
FIG. 3A is a cross-sectional view taken along line IIIA-IIIA in FIG. 1.
Figure 3B:
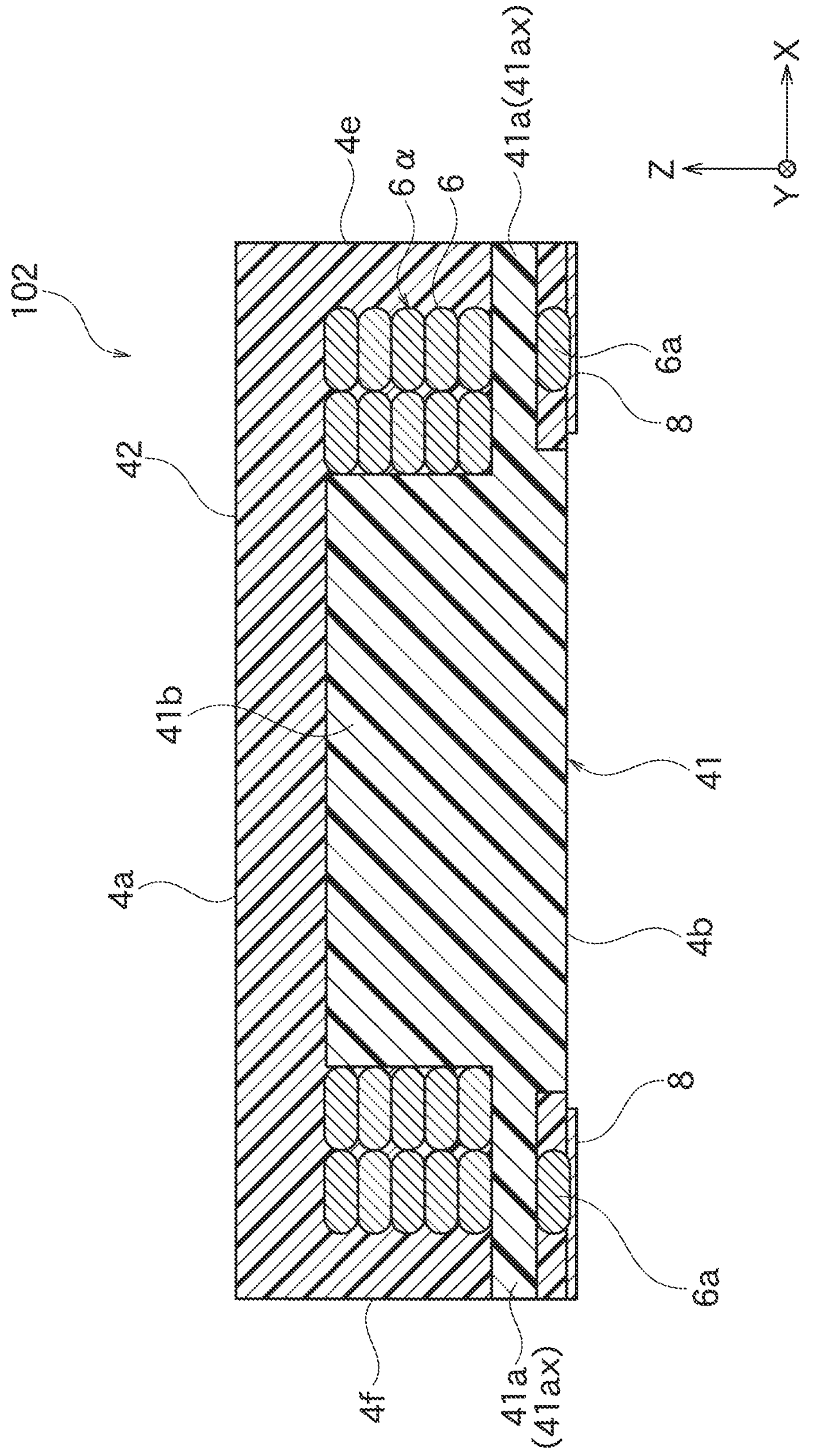
FIG. 3B is a cross-sectional view illustrating a modification example of the coil device shown in FIG. 1 and FIG. 3A.

As shown in FIG. 1 and FIG. 3A, the element main body 4 in this embodiment includes a first core portion 41 and a second core portion 42. Both the first core portion 41 and the second core portion 42 can be constituted by a dust core containing metal particles 12 and a resin 14.

The metal particles 12 contained in the core portions 41 and 42 are not particularly limited as long as the metal particles are magnetic materials. Examples thereof include an Fe—Ni alloy, an Fe—Si alloy, an Fe—Co alloy, an Fe—Si—Cr alloy, an Fe—Si—Al alloy, an Fe-containing amorphous alloy, an Fe-containing nano-crystalline alloy, and other soft magnetic alloys. Note that, subcomponents may be appropriately added to the metal particles 12.

In addition, for example, both of the first core portion 41 and the second core portion 42 may be constituted by the same kind of metal particles 12, and relative permeability μ1 of the first core portion 41 and relative permeability μ2 of the second core portion 42 may be set to be the same as each other. Alternatively, the composition of the metal particles 12 may be different between the first core portion 41 and the second core portion 42.

Further, with regard to the metal particles 12 contained in the first core portion 41 or the second core portion 42, a median diameter (D50) thereof may be set to approximately 5 to 50 μm. Particularly, in this embodiment, the metal particles 12 contained in the second core portion 42 are preferably constituted by mixing a plurality of particle groups different in D50. For example, the metal particles 12 of the second core portion 42 is preferably constituted by mixing large particles 12*a* of which D50 is 8 to 15 μm, medium particles 12*b* of which D50 is 1 to 5 μm, and small particles 12*c* of which D50 is 0.3 to 0.9 μm. Alternatively, a combination of the large particles 12*a* and the medium particles 12*b*, a combination of the large particles 12*a* and the small particles 12*c*, a combination of the medium particles 12*b* and the small particles 12*c*, and the like may be employed. Note that, the large particles 12*a*, the medium particles 12*b*, and the small particles 12*c* may be constituted by the same kind of material, or may be constituted by different materials.

In the case of mixing a plurality of particle groups as described above, a content ratio of each particle group is not particularly limited. For example, in the case of mixing three kinds of particle groups (the large particles 12*a*, the medium particles 12*b*, and the small particles 12*c*), a ratio of the large particles 12*a* is preferably 50% to 90%, a ratio of the medium particles 12*b* is preferably 0% to 30%, and a ratio of the small particles is preferably 5% to 30%. Note that, the ratio of the large particles 12*a* is $A_A/A_T$, in which $A_A$ is an area occupied by the large particles 12*a* in a cross-section of the element main body 4, and $A_T$ is a total sum of areas occupied by the metal particles 12 (that is, total areas of 12*a*-12*c*) in the cross-section. The ratio of the medium particles 12*b* and the ratio of the small particles 12*c* may be calculated in the same manner as the ratio of the large particles 12*a*.

Further, the metal particles 12 of the first core portion 41 may also be constituted by mixing a plurality of particle groups different in D50 as described above. Since the metal particles 12 contained in the first core portion 41 or the second core portion 42 are constituted by the plurality of particle groups, a packing density of the metal particles 12 contained in the element main body 4 can be increased. As a result, various characteristics of the inductor 2 such as permeability, eddy current loss, and DC bias characteristics are improved.

Here, the particle size of the metal particles 12, the area occupied by each particle group can be measured by observing the cross-section of the element main body 4 with a scanning electron microscope (SEM), a scanning transmission electron microscope (STEM), or the like, and performing image analysis of an obtained cross-section photograph with software. At this time, it is preferable that the particle size of the metal particles 12 is measured in terms of an equivalent circle diameter.

Moreover, the metal particles 12 contained in the element main body 4 are preferably insulated from each other. Examples of an insulating method include a method of forming an insulation coating on a particle surface. Examples of the insulation coating include a film formed from a resin or an inorganic material, and an oxidized film formed by oxidizing the particle surface through heat treatment. In the case of forming the insulation coating with a resin or an inorganic material, examples of the resin include a silicone resin, and an epoxy resin. Examples of the inorganic material include phosphates such as magnesium phosphate, calcium phosphate, zinc phosphate, and manganese phosphate, silicates such as sodium silicate (water glass), soda lime glass, borosilicate glass, lead glass, aluminosilicate glass, borate glass, and sulfate glass. Note that, it is preferable that the thickness of the insulation coating of the metal particles 12 is 5 to 20 nm. By forming the insulation coating, insulation properties among particles can be enhanced, and a withstand voltage of the inductor 2 can be improved.

In addition, the resin 14 included in each of the core portions 41 and 42 is not particularly limited, for example, thermosetting resins such as an epoxy resin, a phenol resin, a melamine resin, a urea resin, a furan resin, an alkyd resin, a polyester resin, and a diallyl phthalate resin, thermoplastic resins such as an acrylic resin, polyphenylene sulfide (PPS), polypropylene (PP), and a liquid crystal polymer (LCP), or the like can be used.

As shown in FIG. 1, the first core portion 41 includes flange portions 41*a*, a winding core portion 41*b*, and notched portions 41*c*. The flange portions 41*a* protrudes toward each of the side surfaces 4*c* to 4*f* of the element main body 4, and four pieces of flange portions 41*a* are formed in correspondence with the side surfaces 4*c* to 4*f*. The coil portion 6α is mounted on upper surfaces of the flange portions 41*a*, and the flange portions 41*a* support the coil portion 6α. Here, two pieces of the flange portions 41*a* protruding along the X-axis direction are referred to as first flange portions 41*ax*, and two pieces of the flange portions 41*a* protruding along the Y-axis direction are referred to as second flange portions 41*ay*. The thickness of the first flange portions 41*ax* is smaller than the thickness of the second flange portions 41*ay*, and a space in which a part of a lead portion 6*a* is accommodated exists under the first flange portions 41*ax*.

The winding core portion 41*b* is located above the flange portions 41*a* in the Z-axis direction, and is formed integrally with the flange portions 41*a*. Further, the winding core portion 41*b* has a shape of approximately elliptical column protruding toward an upward side in the Z-axis, and is inserted to an inner side of the coil portion 6α. The shape of the winding core portion 41*b* is not limited to the shape shown in FIG. 1 and FIG. 3A, and may be set to a shape that matches a winding shape of the coil portion 6α. For example, the shape of the winding core portion 41*b* may be set to a circular column shape or a prism shape.

The notched portions 41*c* are located among the flange portions 41*a*, and four pieces of the notched portions 41*c* are formed at corners of an X-Y plane. That is, the notched portions 41*c* are formed in the vicinity of sites at which the side surfaces 4*c* to 4*f* of the element main body 4 intersect each other. The notched portions 41*c* are used as a passage through which the lead portion 6*a* drawn from the coil portion 6α passes. In addition, the notched portions 41*c* also function as a passage when a molding material that constitutes the second core portion 42 flows from a front surface side to a rear surface side of the first core portion 41 in a manufacturing process. In FIG. 1, the notched portion 41*c* is cut in an approximately square shape, but the shape of the notched portion 41*c* is not particularly limited as long as the lead portion 6*a* and/or the molding material can be pass there through. For example, the notched portions 41*c* may be a through-hole that passes through front and rear surfaces of the flange portions 41*a*.

As shown in FIG. 3A, the second core portion 42 covers the first core portion 41. More specifically, the second core portion 42 covers the coil portion 6α and the winding core portion 41*b* above the flange portion 41*a*. Moreover, the second core portion 42 is filled in the spaces existed the notched portion 41*c* and under the first flange portions 41*ax*. Note that, as shown in FIG. 2, a lower surface of the second flange portions 41*ay* constitutes a part of the bottom surface 4*b* of the element main body 4, and the second core portion 42 is not filled under the second flange portions 41*ay*.

As shown in FIG. 1, a pair of the lead portions 6*a* are drawn from the coil portion 6α along the Y-axis. Further, the pair of lead portions 6*a* are folded back in the vicinity of the side surface 4*c* of the element main body 4 and extend from the side surface 4*c* to the side surface 4*d* under the first flange portions 41*ax*.

Here, a height h from the bottom surface 4*b* of the element main body 4 to the first flange portions 41*ax* in the Z-axis direction is shorter than an outer diameter of each of the lead portions 6*a* as shown in FIG. 3A and FIG. 4A. Accordingly, the majority of the lead portion 6*a* is accommodated at the inside of the element main body 4 (particularly, the second core portion 42), but a part of an outer periphery of the lead portion 6*a* is exposed to the bottom surface 4*b* of the element main body 4. Each of the lead portions 6*a* is constituted by the wire 6, but at a site exposed to the bottom surface 4*b*, the insulating layer 62 existing on the outer periphery of the wire 6 is removed, and the conductor portion 61 of the wire 6 is exposed.

As shown in FIG. 2 and FIG. 4A, the terminal electrode 8 is formed to cover the conductor portion 61 of the lead portion 6*a* exposed to the bottom surface 4*b*. Then, the conductor portion 61 of the lead portion 6*a* is electrically connected to the terminal electrode 8. In this embodiment, an outer surface on the element main body 4 contacted with the terminal electrode 8 is referred to as an electrode facing portion 20. Particularly, in this embodiment, the terminal electrode 8 is formed on the bottom surface of the second core portion 42, and the electrode facing portion 20 exists at a part of the bottom surface of the second core portion 42.

In this embodiment, the terminal electrode 8 includes at least a resin electrode layer 81. In addition, the terminal electrode 8 may have a stacked structure including the resin electrode layer 81 and other electrode layers. In a case where the terminal electrode 8 is set to have the stacked structure, the resin electrode layer 81 is formed so as to be in direct contact with the electrode facing portion 20 of the element main body 4. Then, the other electrode layers are stacked on an outside-surface of the resin electrode layer 81. That is, the other electrode layers are stacked on a side opposite of the electrode facing portion 20 via the resin electrode layer 81. The other electrode layers may be a single layer or a plurality of layers, and a material thereof is not particularly limited. For example, the other electrode layers can be constituted by a metal such as Sn, Au, Cu, Ni, Pt, Ag, and Pd, or alloy containing at least one kind of the above metal elements. Further, the other electrode layers can be formed by plating or sputtering. Moreover, an entire average thickness of the terminal electrode 8 is preferably 3 to 60 μm, and an average thickness of the resin electrode layer 81 is preferably 1 to 50 μm.

As shown in FIGS. 4B and 4C, the resin electrode layer 81 includes a resin component 82 and a conductor powder 83. The resin component 82 in the resin electrode layer 81 is constituted by a thermosetting resin such as an epoxy resin and a phenol resin. On the other hand, the conductor powder 83 can be constituted by a metal powder such as Ag, Au, Pd, Pt, Ni, Cu, and Sn, or a alloy powder containing at least one kind of the above elements, and it is preferable that the conductor powder 83 particularly contains Ag as a main component.

Moreover, in this embodiment, it is preferable that the conductor powder 83 of the resin electrode layer 81 is constituted by two particle groups different in a particle size distribution, that is, first particles 83*a* and second particles 83*b*. The first particles 83*a* are a group of particles on the order of micrometers. In this embodiment, "particles on the order of micrometers" mean particles having an average particle size of 0.05 μm or more and several tens of μm or less. The average particle size of the first particles 83*a* is preferably 1 to 10 μm on a cross-section of the resin electrode layer 81, and more preferably 3 to 5 μm.

In addition, a shape of the first particles 83*a* is preferably a shape close to a sphere, a long spherical shape, an irregular block shape, a needle shape, or a plat shape, and more preferably the needle shape or the flat shape. In this embodiment, particles having an aspect ratio of 2 to 30 in the cross-section of the resin electrode layer 81 are referred to as the flat shaped particles, in which the aspect ratio is a ratio of a length in a longitudinal direction to a length in a short-length direction. Note that, the average particle size of the first particles 83*a* can be measured by observing the cross-section of the resin electrode layer 81 with a SEM or a STEM, and performing image analysis of an objected cross-sectional photograph. In this measurement, the average particle size of the first particles 83*a* is calculated in terms of a maximum length.

On the other hand, the second particles 83*b* are a group of particles on the order of nanometers, and have a smaller average particle size than the first particles 83*a*. The second particles 83*b* are aggregated and exist in the vicinity of an outer periphery of the first particles 83*a* and/or particle gaps of the first particles 83*a*. When observing an aggregated portion of the second particles 83*b* with the STEM in an enlarged manner, the second particles 83*b* are recognized as an aggregate of micro-particles that has a particle size of at least 100 nm or less. Note that, it is preferable that the second particles 83*b* are added as nano-particles having an approximately spherical shape and an average particle size of 5 to 30 nm in a process of manufacturing paste that is a raw material of the resin electrode layer 81.

As described above, by containing the first particles 83*a* and the second particles 83*b* in the resin electrode layer 81, a contact resistance of the resin electrode layer 81 can be reduced. Note that, it is preferable that the first particles 83*a* and the second particles 83*b* are mixed in a predetermined ratio in the resin electrode layer 81. Specifically, on a cross-section of the resin electrode layer 81, when a total area occupied by the resin component 82 and the conductor powder 83 is set as 100%, an area occupied by the conductor powder 83 is preferably 60% or less.

Here, the area occupied by each of the elements (resin component 81, conductor powder 83) can be measured by observing the cross-section of the resin electrode layer 81 with the SEM or the STEM and performing image analysis of an obtained cross-sectional image. In the case of using the SEM, it is preferable that the observation is performed with a reflected electron image, and in the case of using the STEM, it is preferable that the measurement is performed with a BF image. In the above observation images, a portion having a dark contrast is the resin component 82 and a portion having a bright contrast is the conductor powder 83. Further, a size of the observation field per one field of view is preferably 0.04 $\mu m^2$ to 0.36 $\mu m^2$ in the above observation, and the area occupied by each elements is preferably calculated as an average value obtained after observation on at least 10 fields or greater.

The resin electrode layer 81 having the above characteristics is directly joined to the electrode facing portion 20 on the element main body 4. In this embodiment, as shown in FIG. 4A, the electrode facing portion 20 includes a leadout electrode portion 20*a*, an exposed portion 20*b*, and a non-exposed portion 20*c*.

The leadout electrode portion 20*a* is constituted by a part of an outer periphery of the lead portion 6*a* exposed to the bottom surface 4*b*. That is, a surface portion of the conductor portion 61 exposed to the bottom surface 4*b* is the leadout electrode portion 20*a*. It is preferable that a diffusion layer A (not illustrated) containing the metal component of the conductor portion 61 and the metal component of the resin electrode layer 81 is formed at an interface between the leadout electrode portion 20*a* and the resin electrode layer 81. The diffusion layer A can be formed by diffusing the metal component of the conductor portion 61 into the conductor powder 83 of the resin electrode layer 81 and alloying thereof. The contact resistance of the terminal electrode 8 can be reduced by formed the diffusion layer at the interface between the leadout electrode portion 20*a* and the resin electrode layer 81.

The exposed portion 20*b* exists to surround the periphery of the leadout electrode portion 20*a* on an X-Y plane. The exposed portion 20*b* is formed by processing a part of the bottom surface 4*b* of the element main body 4 with a laser before forming the terminal electrode 8. Accordingly, the exposed portion 20*b* has surface roughness that is rougher in comparison to a part of the bottom surface 4*b* that is not in contact with the terminal electrode 8.

FIG. 4B is an enlarged cross-sectional view of an interface between the exposed portion 20*b* of the element main body 4 and the resin electrode layer 81. As shown in FIG. 4B, the resin 14 contained in the element main body 4 is removed from the exposed portion 20*b* of the element main body 4 by irradiating the laser, and thus a part of an outer periphery of the metal particles 12 located at an outermost surface of the exposed portion 20 is exposed. That is, the metal particles 12 located on the outermost surface of the exposed portion 20*b* are not cut, and the part of the outer periphery of the metal particles 12 protrudes to the outside of the element main body 4, and is in contact with the resin electrode layer 81.

Particularly, FIG. 4B of this embodiment shows the cross-sectional view in a case that the metal particles 12 are constituted by the large particles 12*a*, the medium particles

12*b*, and the small particles 12*c*. In this case, on the outermost surface of the exposed portion 20*b*, a part of an outer periphery of the large particles 12*a*, and a part of an outer periphery of the medium particles 12*b* are mainly exposed. The small particles 12*c* are likely to be removed with the resin 14 from the bottom surface 4*b* of the element main body 4 due to irradiation with the laser. Accordingly, a ratio of the small particles 12*c* exposed to the exposed portion 20*b* is smaller in comparison to the large particles 12*a* or the medium particles 12*b*.

Further, at the interface between the exposed portion 20*b* and the resin electrode layer 81 shown in FIG. 4B, a part of the resin electrode layer 81 gets into a gap among the metal particles 12 located on the outermost surface of the exposed portion 20*b*. Particularly, in this embodiment, the second particles 83*b* in a nanometer order are contained in the resin electrode layer 81, and the second particles 83*b* are mainly entered in a gap among the metal particles 12 located on the outermost surface of the exposed portion 20*b*. Moreover, since the second particles 83*b* show high reactivity in comparison to particles in a micrometer order, a diffusion layer B (not illustrated) may be formed at the interface between the exposed portion 20*b* and the resin electrode layer 81. The diffusion layer B can be formed at a position where the metal particles 12 of the element main body 4 and the second particles 83*b* of the resin electrode layer 81 are in contact with each other.

In the case of formed the insulation coating (not illustrated) on the surface of the metal particles 12, the insulation coating may remain at the outer periphery of the metal particles 12 exposed to the outside of the element main body 4. In this case, the insulation coating of the exposed metal particles 12 exists on the outermost surface of the exposed portion 20*b*, and direct contact with the resin electrode layer 81.

On the other hand, the non-exposed portion 20*c* is located at an edge of the electrode facing portion 20 as shown in FIG. 4A, and is not subjected to the laser processing differently from the exposed portion 20*b*. Therefore, the non-exposed portion 20*c* has a surface that is formed at the time of molding the element main body 4, and surface roughness thereof is approximately the same as that of the part of the bottom surface 4*b* that is not in contact with the terminal electrode 8. Note that, the position of the non-exposed portion 20*c* is not limited to the aspect shown in FIG. 4A, and the non-exposed portion 20*c* should be located on the outside of the exposed portion 20*b* in the planar direction (X-Y plane).

FIG. 4C is an enlarged cross-sectional view of an interface between the non-exposed portion 20*c* and the resin electrode layer 81. As shown in FIG. 4C, the resin 14 is not removed from the surface of the non-exposed portion 20*c*. Accordingly, the metal particles 12 located at the non-exposed portion 20*c* do not protrude to the outside of the element main body 4. Then, the metal particles 12 of the non-exposed portion 20*c* are covered with the resin 14 and embedded inside of the element main body 4. That is, there are a lot of regions where the resin 14 of the element main body 4 is contacted with the resin electrode layer 81, at the interface between the non-exposed portion 20*c* and the resin electrode layer 81.

On the cross-section as illustrated in FIG. 4A, when a length of a boundary line between the electrode facing portion 20 and the resin electrode layer 81 is set as 100%, a ratio of a length of the exposed portion 20*b* is preferably set to 60% to 85%. On the other hand, a ratio of a length of the non-exposed portion 20*c* is preferable 15% or less.

Next, an example of a method for manufacturing the inductor 2 according to this embodiment is described.

First, the first core portion 41 is prepared by a press method such as heating and pressing molding method, or an injection molding method. In preparation of the first core portion 41, a raw material powder of the metal particles 12, a binder, a solvent, and the like are kneaded to obtain a granule and the granule is used as a molding raw material. In a case where the metal particles 12 of the first core portion 41 are constituted by a plurality of particle groups, raw material powders different in a particle size distribution are prepared, and may be mixed in a predetermined ratio.

Next, the coil portion 6α is mounted on the obtained first core portion 41. The coil portion 6α is an coreless coil obtained by winding the wire 6 in a predetermined shape in advance, and the coreless coil is inserted into the winding core portion 41*b* of the first core portion 41. Alternatively, the coil portion 6α can be formed by directly winding the wire 6 around the winding core portion 41*b* of the first core portion 41. After combining the first core portion 41 and the coil portion 6α, the pair of lead portions 6*a* are drawn from the coil portion 6α, and are disposed under the first flange portions 41*ax*, as shown in FIG. 1.

Next, the second core portion 42 is prepared by the insert injection molding. In preparation of the second core portion 42, first, the first core portion 41 equipped with coil portion 6α is putted in a mold. It is preferable to spread a release film on an inner surface of the mold in advance. A flexible sheet-shaped member such as a PET film can be used as the release film. Since the release film is used, the lead portion 6*a* existed under the first flange portions 41*ax* comes into close contact with the release film, when putting the first core portion 41 in the mold. Therefore, a part of the outer periphery of the lead portion 6*a* is covered with the release film, and protrudes from the bottom surface 4*b* of the element main body 4 after forming the second core portion 42.

As a raw material that constitutes the second core portion 42, a composite material having fluidity at the time of molding is used. Specifically, the composite material obtained by kneading a raw material powder of the metal particles 12, and a binder such as the thermoplastic resin or the thermosetting resin may be used. A solvent, a dispersant, or the like may be appropriately added to the composite material. In a case where the metal particles 12 of the second core portion 42 are constituted by the large particles 12*a*, the medium particles 12*b*, and the small particles 12*c*, it is preferable that mixing ratios of each particle groups with respect to the total weight of the raw material powder of the metal particles 12 are a predetermined ratio. Specifically, the mixing ratio of the large particles 12*a* is preferably 70 to 80 wt %, the mixing ratio of the medium particles 12*b* is 10 to 15 wt %, and the mixing ratio of the small particles 12*c* is 10 to 15 wt %.

In addition, the above composite material is introduced into the mold in a slurry state, in the insert injection molding. At this time, the introduced slurry passes through the notched portion 41*c* of the first core portion 41 and is also filled under the first flange portions 41*ax*. Then, during the injection molding, heat is appropriately applied according to the type of the binder of the composite material. In this manner, the element main body 4 is obtained, in which the first core portion 41, the second core portion 42, and the coil portion 6α are integrated.

Next, the leadout electrode portion 20*a* and the exposed portion 20*b* are formed by irradiating the laser for a part of the bottom surface 4*b* of the element main body 4. Due to the laser irradiation, the insulating layer 62 of the lead portion 6*a* protruding to the bottom surface 4*b* is removed. Thereby, the conductor portion 61 is exposed and the leadout electrode portion 20*a* is formed. Moreover, due to the laser irradiation, the resin 14 contained in the element main body 4 (second core portion 42) is removed from the outermost surface of the bottom surface 4*b*, and the exposed portion 20*b* is formed at a site which the bottom surface 4*b* was irradiated with the laser.

Here, the laser used in the above process preferably has a wavelength of 400 nm or less. That is, the laser is preferably a UV laser or the like having a shorter wavelength than a green laser (wavelength: 532 nm). As described above, by using the short-wavelength laser, the metal particles 12 such as the large particles 12*a* and the medium particles 12*b* are not removed, and the resin 14 and the insulating layer 62 of the lead portion 6*a* are selectively removed. Further, by using the above short-wavelength laser, the insulation coating formed on the surface of the metal particles 12 is hardly removed, and tends to remain.

Next, resin electrode paste is applied to a part of the bottom surface 4*b* of the element main body 4 by a method such as a printing method. At this time, the resin electrode paste is applied to cover the site irradiated with the laser. That is, the leadout electrode portion 20*a* and the exposed portion 20*b* are covered with the resin electrode paste. In this case, an area of the resin electrode layer 81 becomes larger than an area irradiated with the laser, in the X-Y plane shown in FIG. 2. In addition, among sites which are in contact with the resin electrode layer 81 of the bottom surface 4*b*, a site that is not irradiated with the laser becomes the non-exposed portion 20*c*.

Note that, a binder becoming the resin component 82 and a metal raw material powder becoming the conductor powder 83 are contained in the resin electrode paste. In this embodiment, the metal raw material powder is constituted by micro-particles having a particle size of the micrometer order, and nano-particles having a particle size of the nanometer order. The micro-particles are particles becoming the first particles 83*a* after hardened the paste, and an average particle size thereof is preferably 1 to 10 μm, and more preferably 3 to 5 μm. On the other hand, the nano-particles are particles becoming the second particles 83*b* after hardened the paste, and an average particle size thereof is preferably 5 to 30 nm, and more preferably 5 to 15 nm.

After applying the resin electrode paste to the element main body 4, the element main body 4 is heated under predetermined conditions to harden a binder (resin component 82) in the paste. The heating conditions may be appropriately set in accordance with the kind of the binder. In this manner, the resin electrode layer 81 is formed on the bottom surface 4*b* of the element main body 4.

In addition, the plating film or the sputtering film may be appropriately formed on the outer surface of the resin electrode layer 81. For example, by formed a plating film of Ni, Cu, Sn, or the like on the outer surface of the resin electrode layer 81, solder wettability is improved.

The inductor 2 having the pair of terminal electrodes 8 formed in the element main body 4 is obtained by the above manufacturing method.

(Summary of Embodiment)

In the inductor 2 of this embodiment, the exposed portion 20*b* exists in the electrode facing portion 20 of the element main body 4 that is in contact with the terminal electrode 8. Then, the resin 14 is removed from the outermost surface of the exposed portion 20*b*, and the part of the outer periphery of the metal particles 12 located on the outermost surface is exposed. Further, in the inductor 2 of this embodiment, the resin electrode layer 81 of the terminal electrode 8, and the exposed portion 20*b* of the electrode facing portion 20 are joined to each other.

According to the above configuration, at the interface between the exposed portion 20*b* and the resin electrode layer 81, the resin electrode layer 81 are entered in the gap among the metal particles 12 located on the outermost surface of the exposed portion 20*b*. As a result, adhesiveness between the exposed portion 20*b* and the resin electrode layer 81 is improved, and the terminal electrode 8 is strongly joined to the element main body 4.

Note that, the insulation coating may remain on the surface of the metal particles 12 located on the outermost surface of the exposed portion 20*b*. That is, it is not necessary to remove the insulation coating of the metal particles 12 from the outermost surface of the electrode facing portion 20. In the inductor 2 of this embodiment, even when not removing the insulation coating, joining strength of the terminal electrode 8 can be sufficiently secured.

In addition, in this embodiment, the conductor powder 83 of the resin electrode layer 81 includes the first particles 83*a* having the particle size of the micrometer order and the second particles 83*b* having the particle size of the nanometer order. Due to the above configuration, the second particles 83*b* aggregate among particle gaps of the first particles 83*a* at the inside of the resin electrode layer 81, and play a role of electrically connecting the first particles 83*a*. As a result, contact resistance of the terminal electrode 8 can be more reduced.

Furthermore, since the second particles 83*b* are contained in the resin electrode layer 81, the second particles 83*b* are filled in the gap among the metal particles 12 on the outermost surface of the exposed portion 20*b*. As a result, adhesiveness between the exposed portion 20*b* and the resin electrode layer 81 is further improved, and joining strength of the terminal electrode 8 to the element main body 4 can be further raised.

In addition, in this embodiment, the metal particles 12 contained in the element main body 4 are constituted by at least two or more kinds of particle groups different in an average particle size and D50. Due to the above configuration, the packing density of the metal particles 12 contained in the element main body 4 can be improved, and the ratio of the resin exposed to the electrode facing portion 20 can be more reduced. As a result, adhesiveness between the exposed portion 20*b* and the resin electrode layer 81 further increases, and the joining strength of the terminal electrode 8 can be further improved.

In addition, the electrode facing portion 20 of this embodiment includes the leadout electrode portion 20*a* exposed the conductor portion 61 of the lead portion 6*a*, and the non-exposed portion 20*c* not removed the resin 14, in addition to the exposed portion 20*b*. And, the exposed portion 20*b* is located at the periphery of the leadout electrode portion 20*a*, in the plane direction (X-Y plane) of the electrode facing portion 20. In the inductor 2 of this embodiment, since the exposed portion 20*b* and the resin electrode layer 81 are strongly in close contact with each other, and thus adhesiveness between leadout electrode portion 20*b* and the resin electrode layer 81 is also improved. As a result, the joining strength of the terminal electrode 8 is further improved, and the contact resistance of the terminal electrode 8 can be reduced.

Modification Example

Hereinbefore, the embodiment of the present invention has been described, but the present invention is not limited to the above embodiment, and various modifications can be made within the scope of the present invention.

For example, in FIG. 1 to FIG. 3A, the coil portion 6α is constituted by a round wire 6. However, the kind of the wire 6 is not limited thereto, and may be a flat wire in which a cross-sectional shape of a conductor portion is an approximately rectangular shape as illustrated in FIG. 3B. Alternatively, the wire may be a square wire or a litz wire made by twisting multiple thin wires. Furthermore, the coil portion 6α may be constituted by laminating conductive plate materials.

And, in the above-described embodiment, the terminal electrode 8 is formed on the bottom surface 4*b* of the element main body 4. However, the position of the terminal electrode 8 is not limited thereto, and may be formed on the upper surface 4*a* or the side surfaces 4*c* to 4*f*, or may be formed over a plurality of surfaces.

And, the first core portion 41 that constitutes the element main body 4 may be a sintered body of a ferrite powder or a metal magnetic powder. Further, the element main body 4 itself may be a dust core of an FT type, an ET type, an EI type, a UU type, an EE type, an EER type, a UI type, a drum type, a toroidal type, a pot type, or a cup type, and the inductor may be constituted by winding the wire around the dust core. In this case, it is not necessary to embed the lead portion inside the element main body, and the lead portion may be drawn along an outer periphery of the core to be connected to the outer surface of the terminal electrode 8.

The electronic component according to the present invention is not limited to the inductor, and may be an electronic component such as a transformer, a choke coil, and a common mode filter, or a composite electronic component combined an inductor element and another element such as a capacitor element.

2 . . . Inductor
4 . . . Element main body
4*a* . . . Upper surface
4*b* . . . Bottom surface
4*c*-4*f* . . . Side surface
41 . . . First core portion
41*a* . . . Flange portion
41*b* . . . Winding core portion
41*c* . . . Notched portion
42 . . . Second core portion
6α . . . Coil portion
6 . . . Wire
61 . . . Conductor portion
62 . . . Insulating layer 62
6*a* . . . Lead portion
8 . . . Terminal electrode
81 . . . Resin electrode layer
82 . . . Resin component
83 . . . Conductor powder
83*a* . . . First particles
83*b* . . . Second particles
20 . . . Electrode facing portion
20*a* . . . Lead electrode portion
20*b* . . . Exposed portion
20*c* . . . Non-exposed portion

What is claimed is:

1. An electronic component comprising:
an element body containing metal particles and a resin; and
a resin electrode layer formed on an electrode facing portion which is a part of an outer surface of the element body, wherein:
the resin electrode layer contains a resin component and a conductor powder,
the electrode facing portion includes an exposed portion formed by removing the resin on an outermost surface of the element body to expose a part of an outer periphery of the metal particles located on the outermost surface,
the electrode facing portion further includes a leadout electrode portion where a part of a conductor located inside the element body is exposed and a non-exposed portion where the resin is not removed from the outermost surface of the element body,
the exposed portion is located at a periphery of the leadout electrode portion in a plane direction of the electrode facing portion,
the non-exposed portion is located on an outer periphery of the exposed portion,
the metal particles located at the non-exposed portion are covered with the resin and the exposed portion has surface roughness that is rougher in comparison to a surface of the non-exposed portion, and
the resin electrode layer is joined to both the exposed portion and the non-exposed portion of the electrode facing portion.

2. The electronic component according to claim 1,
wherein the metal particles contained in the element body are constituted by at least two or more kinds of particle groups different in an average particle size.

3. The electronic component according to claim 1,
wherein the conductor powder of the resin electrode layer includes first particles having a particle size in a micrometer order, and second particles having a particle size in a nanometer order.

4. The electronic component according to claim 3,
wherein a part of the second particles of the resin electrode layer is filled in a gap among the metal particles on the outermost surface of the exposed portion, and the metal particles and the part of the second particles of the resin electrode layer are in contact with each other.

5. The electronic component according to claim 1,
wherein the conductor powder of the resin electrode layer includes second particles having a particle size in a nanometer order, and
a part of the second particles is filled in a gap among the metal particles on the outermost surface of the exposed portion, and the metal particles and the part of the second particles of the resin electrode layer are in contact with each other.

6. The electronic component according to claim 5,
wherein the metal particles contained in the element body are constituted by at least two or more kinds of particle groups different in an average particle size.

* * * * *